(12) United States Patent
Sze

(10) Patent No.: US 11,022,198 B2
(45) Date of Patent: *Jun. 1, 2021

(54) CORD LOCK

(71) Applicant: NIKE, Inc., Beaverton, OR (US)

(72) Inventor: Kevin C. Sze, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/701,915

(22) Filed: Dec. 3, 2019

(65) Prior Publication Data
US 2020/0103002 A1 Apr. 2, 2020

Related U.S. Application Data

(63) Continuation of application No. 15/685,602, filed on Aug. 24, 2017, now Pat. No. 10,527,129.

(60) Provisional application No. 62/379,977, filed on Aug. 26, 2016.

(51) Int. Cl.
F16G 11/10 (2006.01)
A43C 7/08 (2006.01)
A43C 7/00 (2006.01)

(52) U.S. Cl.
CPC .............. F16G 11/101 (2013.01); A43C 7/08 (2013.01); F16G 11/103 (2013.01); A43C 7/00 (2013.01)

(58) Field of Classification Search
CPC . A43C 7/08; A43C 7/00; F16G 11/103; F16G 11/101
See application file for complete search history.

(56) References Cited

U.S. PATENT DOCUMENTS

| 560,683 | A | 5/1896 | Bruckner |
| 3,187,396 | A | 6/1965 | Carroll |
| 3,696,474 | A | 10/1972 | Slauta |
| 4,346,394 | A | 8/1982 | Figueroa et al. |
| 4,393,550 | A | 7/1983 | Yang et al. |
| 4,592,116 | A | 6/1986 | Christensen |
| 4,769,874 | A | 9/1988 | Tracy |
| 4,817,250 | A | 4/1989 | Kurosaki |
| 4,912,814 | A | 4/1990 | McKenzie |
| 5,182,838 | A | 2/1993 | Stenner |

(Continued)

FOREIGN PATENT DOCUMENTS

| CN | 87211181 U | 3/1988 |
| CN | 104819251 A | 8/2015 |

(Continued)

OTHER PUBLICATIONS

"Tri-Mountain 1/4-Zip Corded Fleece Collar Pullover for Men," E-sportsclothing, e-sports-clothing.com, Jun. 10, 2014, http://www.e-sports-clothing.com/2014/06/tri-mountain-14-zip-corded-fleece-collar-pullover-for-men/.

(Continued)

Primary Examiner — Robert Sandy
Assistant Examiner — Louis A Mercado
(74) Attorney, Agent, or Firm — Shook Hardy & Bacon L.L.P.

(57) ABSTRACT

A cord lock includes various components used to slidably adjust a length of cord. The cord lock may include a first cord-clamp bar and a second cord-clamp bar that are movably coupled to each other, to allow control of frictional resistance on a cord threaded through various apertures and cord-receiving channels of the cord lock. The cord lock may be incorporated into an article such that it is at least partially concealed within an article layer.

18 Claims, 7 Drawing Sheets

(56) References Cited

U.S. PATENT DOCUMENTS

| | | |
|---|---|---|
| 5,195,218 A | 3/1993 | Joseph et al. |
| 5,263,202 A | 11/1993 | Siberell |
| 5,299,323 A | 4/1994 | Schaefer et al. |
| 5,337,458 A | 8/1994 | Fukutomi et al. |
| 5,345,656 A | 9/1994 | Merritt |
| 5,365,641 A | 11/1994 | Watanabe et al. |
| 5,440,788 A | 8/1995 | Boden |
| 5,454,140 A | 10/1995 | Murai |
| 5,511,290 A | 4/1996 | Perry et al. |
| 5,903,959 A | 5/1999 | Leonardi |
| 6,317,894 B1 | 11/2001 | Blechman |
| 6,510,627 B1 | 1/2003 | Liu |
| 6,618,863 B2 | 9/2003 | Blechman |
| 6,658,704 B2 | 12/2003 | Buscart |
| 6,966,102 B2 | 11/2005 | Shiue |
| 7,254,871 B2 | 8/2007 | Yoshiguchi |
| 7,415,750 B2 | 8/2008 | Kinebuchi et al. |
| 7,574,786 B2 | 8/2009 | Cheng |
| 7,921,522 B2 | 4/2011 | Okot |
| 8,132,298 B2 | 3/2012 | Chan |
| 8,181,320 B2 | 5/2012 | Wolfberg |
| 8,205,316 B2 | 6/2012 | Chu |
| 8,209,822 B2 | 7/2012 | Okot |
| 8,281,413 B2 | 10/2012 | Ly |
| 8,424,169 B2 | 4/2013 | Gammell et al. |
| 8,997,314 B2 | 4/2015 | Kawaguchi |
| 2003/0024086 A1 | 2/2003 | Liu |
| 2003/0024087 A1 | 2/2003 | Liu |
| 2004/0055069 A1 | 3/2004 | Clarke Fayle et al. |
| 2004/0148742 A1 | 8/2004 | Berns |
| 2005/0034281 A1 | 2/2005 | Shiue |
| 2006/0195974 A1 | 9/2006 | Burkhart et al. |
| 2007/0017008 A1 | 1/2007 | Snedeker et al. |
| 2008/0115334 A1 | 5/2008 | Chen et al. |
| 2011/0185476 A1 | 8/2011 | Boisseau et al. |
| 2012/0311768 A1 | 12/2012 | Ladyzhenskaya et al. |
| 2017/0150772 A1 | 6/2017 | Nussbaum |
| 2018/0058543 A1 | 3/2018 | Sze |
| 2018/0153262 A1 | 6/2018 | Shimizu |
| 2019/0078646 A1 | 3/2019 | Shimizu et al. |

FOREIGN PATENT DOCUMENTS

| | | |
|---|---|---|
| CN | 105782344 A | 7/2016 |
| EP | 1654941 A2 | 5/2006 |
| FR | 2925261 A1 | 6/2009 |
| JP | 2003204808 A | 7/2003 |
| JP | 2009183709 A | 8/2009 |
| WO | 0230223 A1 | 4/2002 |

OTHER PUBLICATIONS

Reichl, Janet, "Marmot Venus Jacket Review," Backpacking Light®, backpackinglight.com, Apr. 6, 2010 http://www.backpackinglight.com/cgi-bin/backpackinglight/marmot_venus_jacket_review.htmi#.VgNRDMtViko.

"Woolrich 60/40 Mountain Parka," Basecamp vintage, basecampvintage.com, Jan. 30, 2015 http://basecampvintage.com/2015/01/30/woolrich-6040-mountain-parka/.

"78035 Ladies' Half Zip Double Knit Top," James G. Blaine Elementary School Online Store, corporatecasuals.com, 2011 http://www.corporatecasuals.com/storefront2/item.asp?id=17095&storefrontid=476.

"Crazy Warm Down Hood," Luke's Ultralite, lucksultralite.com, 2013. http://lukesultralite.com/products/downgear.

"Wild things releases tactical outer layers," Soldier Systems, Jun. 4, 2010. http://soldiersystems.net/2010/06/04/wild-things-releases-tactical-outlayers/.

"Square metal alloy stoppers toggle cord lock," AliExpress™, aliexpress.com, seller: JIAXI company limited, accessed: Sep. 2015. http://www.aliexpress.com/item/STP-011-square-metal-alloy-stoppers-toggle-cord-locks-Drawstring-lock-with-two-holes/32458833902.html.

"2 Hole 5.7 mm Shoelace Plastic Buckles," AliExpress™, aliexpress.com, seller: RoYishi's Store, accessed: Sep. 2015. http://www.aliexpress.com/item/20pcs-pack-2-Hole-5-7mm-Shoelace-Plastic-Buckles-Cord-Locks-Toggle-Stopper-Black/32415778455.html.

Communication under Rule 71(3) dated Dec. 13, 2019 in European Patent Application No. 17764720.3, 30 pages.

Extended European Search Report received for European Patent Application No. 20175700.2, dated Jul. 28, 2020, 7 pages.

CORD LOCK

CROSS-REFERENCE TO RELATED APPLICATIONS

This application is a continuation of U.S. Non-Provisional patent application Ser. No. 15/685,602, filed Aug. 24, 2017, and titled "Cord Lock," now issued as U.S. Pat. No. 10,527, 129, which claims priority to U.S. Provisional Patent App. No. 62/379,977, filed Aug. 26, 2016, and titled "Cord Lock." Both of these applications are incorporated herein by reference in the entirety.

TECHNICAL FIELD

The field relates to cord locks.

BACKGROUND

Drawcords or just "cords" (also sometimes referred to as laces, cables, drawstrings, and the like) are commonly integrated into various types of articles (e.g., bags, garments, etc.) to modify a feature of the article, such as a size, dimension, or shape. Cord locks provide a mechanism to adjust, and set, a length of cord. Sometimes the cord lock is only attached to the cord, and not to the article itself, which can result in the cord lock being lost or misplaced if the cord lock is disconnected from the cord. Additionally, a cord lock that is only attached to the cord may be flung about by the cord, which can be undesirable, even if only to a small degree.

BRIEF DESCRIPTION OF THE DRAWINGS

Aspects of the present disclosure are described in detail with reference to the figures, which are incorporated herein by reference, and which are intended to be exemplary and non-limiting in nature, wherein.

DETAILED DESCRIPTION

Figure 1:
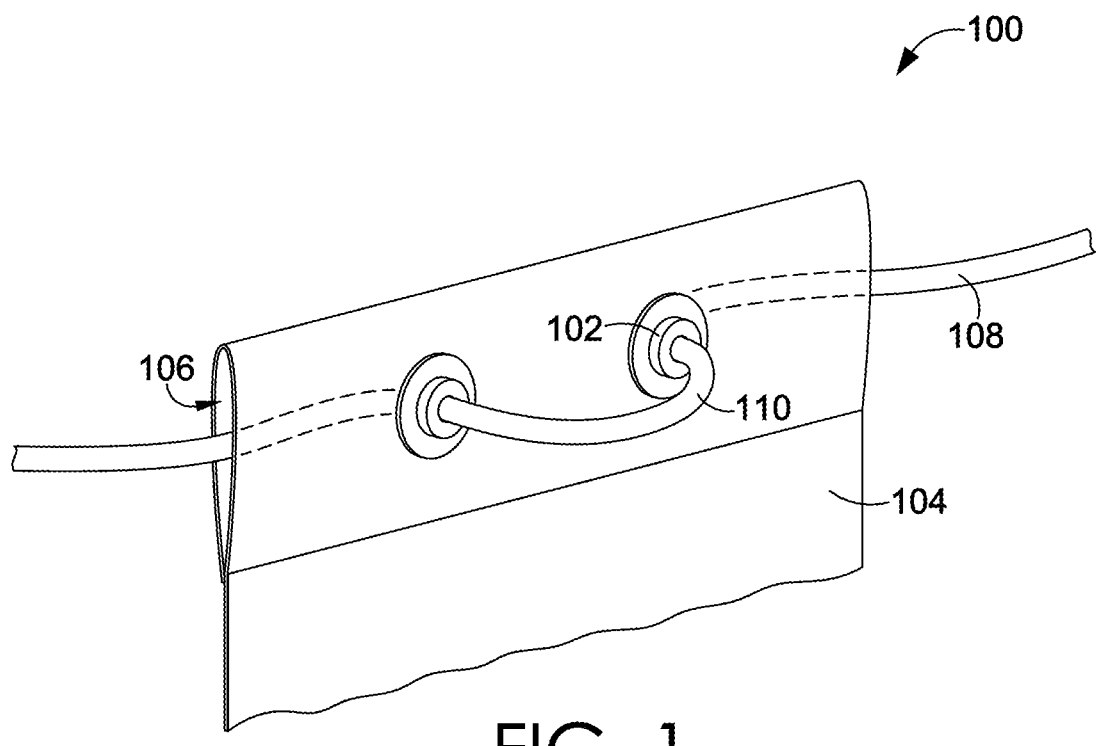
FIG. 1 depicts a perspective view of an article incorporating a cord lock, in accordance with an aspect hereof.

The subject matter of various aspects of the present disclosure is described with specificity herein to meet statutory requirements. However, the description itself is not intended to limit the scope of the invention. Rather, the claimed subject matter may be embodied or carried out in other ways, to include different elements, combinations, components, configurations, and/or steps, including those similar to the ones described in this disclosure, in conjunction with other present or future technologies.

The present disclosure relates generally to cord locks and articles incorporating the same. An exemplary cord lock may include one or more components that releasably clamp onto a cord, allowing slidable adjustment of a length of the cord in response to a force applied to the cord lock. The cord lock may be incorporated into an article or article layer such that it is at least partially concealed, and may be used to adjust a length of cord extending from or through the article.

In one aspect, a cord lock is provided. The cord lock comprises a first cord-clamp bar having a first-bar body with a first side and a second side, the second side generally opposing the first side, the first-bar body including a first thickness between the first side and the second side. The first-bar body includes a first aperture and a second aperture that extend entirely through the first thickness from the first side to the second side. The first cord-clamp bar includes a first protruding member that extends from the second side, the first protruding member including a first cord-receiving channel. The first cord-clamp bar includes a second protruding member that extends from the second side, the second protruding member including a second cord-receiving channel. The cord lock further comprises a second cord-clamp bar having a second-bar body with a third side and a fourth side, the third side generally opposing the fourth side and facing towards the second side of the first cord-clamp bar, the second-bar body including a second thickness between the third side and the fourth side. The second-bar body includes a third aperture and a fourth aperture that extend entirely through the second thickness of the second-bar body from the third side to the fourth side. The first protruding member extends through the third aperture and the second protruding member extends through the fourth aperture. The second cord-clamp bar includes a fifth aperture and a sixth aperture extending entirely though the second thickness, the fifth aperture being axially aligned with the first aperture and including a third cord-receiving channel, the sixth aperture being axially aligned with the second aperture and including a fourth cord-receiving channel. The cord lock further comprises a biasing element coupled between the first cord-clamp bar and the second cord-clamp bar.

In another aspect, an article is provided. The article comprises a first cord-clamp bar having a first-bar body with a first side and a second side, the second side generally opposing the first side, the first-bar body including a first thickness between the first side and the second side. The first-bar body includes a first aperture and a second aperture that extend entirely through the first thickness from the first side to the second side. The first cord-clamp bar includes a first protruding member that extends from the second side, the first protruding member including a first cord-receiving channel. The first cord-clamp bar also includes a second protruding member that extends from the second side, the second protruding member including a second cord-receiving channel. The article further comprises a second cord-clamp bar having a second-bar body with a third side and a fourth side, the third side generally opposing the fourth side and facing towards the second side of the first cord-clamp bar, the second-bar body including a second thickness between the third side and the fourth side. The second-bar body includes a third aperture and a fourth aperture that extend entirely through the second thickness of the second-bar body from the third side to the fourth side. The first protruding member extends through the third aperture and the second protruding member extends through the fourth aperture. The second cord-clamp bar includes a first protruding tubular member that extends from the third side of the second-bar body and through the first aperture of the first-bar body, the first protruding tubular member including a third cord-receiving channel. The second cord-clamp bar also includes a second protruding tubular member that extends from the third side of the second-bar body and through the second aperture of the first-bar body, the second protruding tubular member including a fourth cord-receiving channel. The article further comprises a biasing element coupled between the first cord-clamp bar and the second cord-clamp bar, and a first textile layer having a first surface and a second surface. The first textile layer has a first textile aperture and a second textile aperture extending entirely through a thickness of the first textile layer from the first surface to the second surface, the second surface facing towards the first side of the first cord-clamp bar. The article further comprises a cord passing sequentially through the first cord-receiving channel, the third cord-receiving channel, the fourth cord-receiving channel, and the second cord-receiving channel. The cord further extends through the first textile aperture and the second textile aperture.

In another aspect, an article is provided. The article comprises a first cord-clamp bar having a first-bar body with a first side and a second side, the second side generally opposing the first side, the first-bar body including a first thickness between the first side and the second side. The first-bar body includes a first aperture defined by a first-aperture collar and a second aperture defined by a second-aperture collar, the first aperture and the second aperture extending entirely through the first thickness from the first side to the second side. The first cord-clamp bar also includes a first protruding member that extends from the second side, the first protruding member including a first cord-receiving channel. The first cord-clamp bar further includes a second protruding member that extends from the second side, the second protruding member including a second cord-receiving channel. The article further comprises a second cord-clamp bar having a second-bar body with a third side and a fourth side, the third side generally opposing the fourth side and facing towards the second side of the first cord-clamp bar. The second-bar body includes a second thickness between the third side and the fourth side. The second-bar body also includes a third aperture and a fourth aperture that extend entirely through the second thickness of the second-bar body from the third side to the fourth side. The first protruding member extends through the third aperture and the second protruding member extends through the fourth aperture. The second cord-clamp bar includes a fifth aperture and a sixth aperture extending entirely though the second thickness. The fifth aperture is axially aligned with the first aperture and includes a third cord-receiving channel, and the sixth aperture is axially aligned with the second aperture and includes a fourth cord-receiving channel. The article further comprises a biasing element coupled between the first cord-clamp bar and the second cord-clamp bar. The article further comprises a textile layer having a first surface and a second surface, the textile layer having a first textile aperture and a second textile aperture extending entirely through a thickness of the textile layer from the first surface to the second surface, the second surface facing towards the first side of the first cord-clamp bar. The article further comprises a first grommet that reinforces the first textile aperture and is coupled to the textile layer and to the first-aperture collar, and a second grommet that reinforces the second textile aperture and is coupled to the textile layer and to the second-aperture collar. A cord passes sequentially through the first cord-receiving channel, the third cord-receiving channel, the fourth cord-receiving channel, and the second cord-receiving channel.

A "cord" as used herein includes, but is not limited to, a string, strand, fiber, cord, rope, yarn, thread, strap, ribbon, lace, band, and the like. A cord may be comprised of multiple filaments or a monofilament. A band may be wound, braided, knit, woven, spun, cut, and the like. In an exemplary aspect, a cord is an element used in connection with apparel, footwear, equipment, and the like to secure, tighten, constrict, wrap, or otherwise exert a tensioning force about an element (e.g., a wearer or an article). Specifically, it is contemplated herein that a cord, cord lock, and/or article or article layer incorporating a cord lock may be used in connection with a shirt, jacket, pant, pair of shorts, ¾ or capris, an article of footwear or outerwear (e.g., gloves, mittens, hat, rain gear, winter gear, etc.), swimwear, bags, outdoor gear (e.g., a tent, a sleeping bag, etc.), and the like. The above-listed use considerations are intended to be exemplary and non-limiting in nature, and other uses are contemplated.

A "biasing element" as used herein may comprise one or more springs, cushions, and/or other elastic or elastically resilient components that provide a biasing force between movable parts of a cord lock. A biasing element may also include a pair of magnets having the same poles oriented towards each other (e.g., a first magnet with a first north pole and a first south pole and a second magnet with a second north pole and a second south pole, where either the first and second north poles or the first and second south poles are oriented towards each other to provide a repelling force that acts as a biasing force). Additionally, a "cord lock" as used herein may comprise a device with one or more components, at least some of which are movable relative to each other for releasably clamping onto a cord to restrict movement of the cord through the cord lock.

Referring to FIG. 1, a perspective view of a portion of an article 100 with a cord lock 102 integrated therein is provided, in accordance with an aspect hereof. The article 100 includes an article layer 104 that is folded over and joined to itself to form a tubular casing 106. The tubular casing 106 may be formed of a single piece of material (e.g., the article layer 104), as shown in FIG. 1, or in alternate aspects may be formed of a composite construction. The composite construction may include multiple pieces of material and/or multiple layers joined together.

FIG. 1 further depicts a cord 108 extending through the tubular casing 106 and through the cord lock 102. A looped portion 110 of the cord 108 is exposed outside of the tubular casing 106. A length of the looped portion 110 may be adjusted by applying a force to the cord lock 102 and pulling on the looped portion 110 of the cord 108 to slide the cord 108 through the cord lock 102. Adjusting the length of the looped portion 110 may allow for modification of a characteristic of the article 100, such as a size of an opening. As shown in FIG. 1, the cord lock 102 is at least partially concealed within the article 100, and more specifically within the tubular casing 106 formed by the article layer 104. The article layer 104 may comprise a woven or knitted textile, a polymer or partial-polymer material, a natural or synthetic material, and/or another type of material, textile, or layer.

Figure 2:
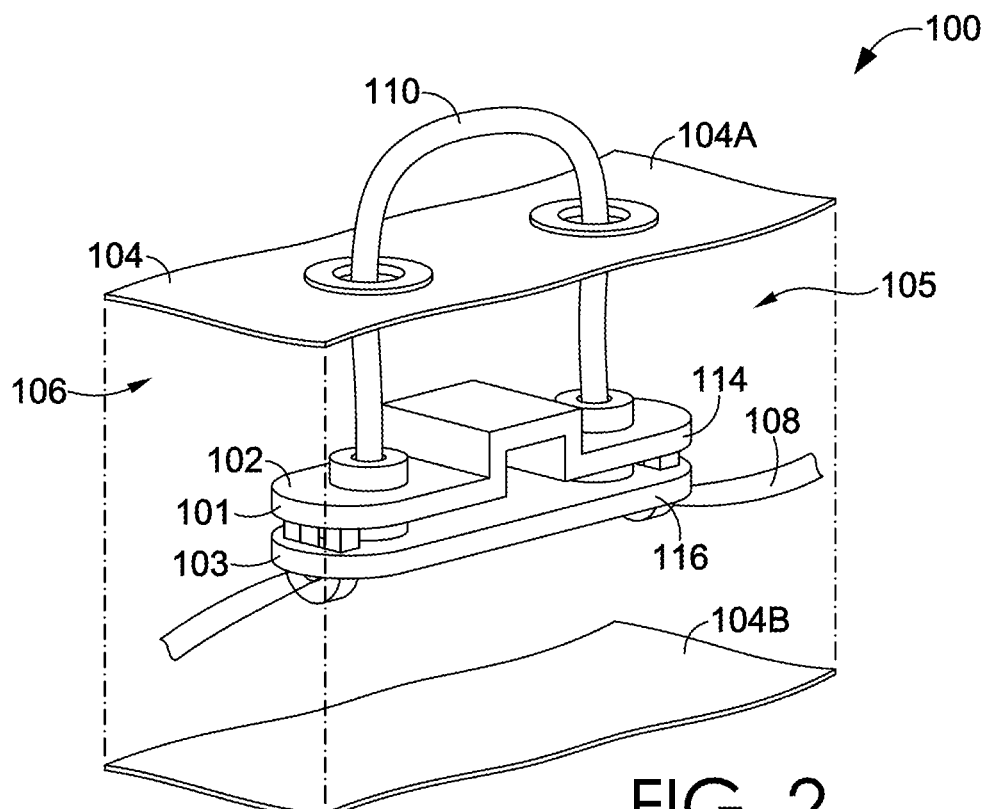
FIG. 2 depicts an exploded view of the article shown in FIG. 1, in accordance with an aspect hereof.
Figure 3:
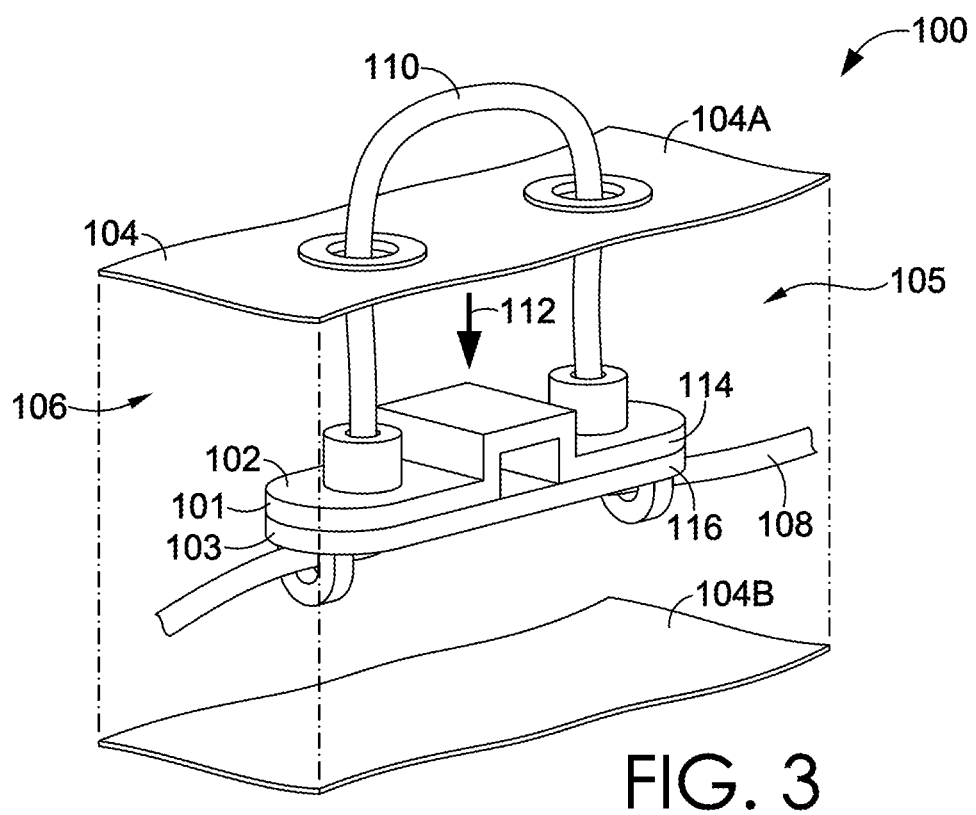
FIG. 3 depicts the article shown in FIG. 2 with a force applied to the cord lock, in accordance with an aspect hereof.

Referring to FIGS. 2-3, exploded perspective views of the article 100 shown in FIG. 1 are provided, in accordance with aspects hereof. In FIG. 2, the cord lock 102 is shown in a resting state with no external force applied, and in FIG. 3, the cord lock 102 is shown in an engaged state with an external force 112 applied. The force 112 moves components of the cord lock 102 relative to each other, increasing alignment of various pathways within the cord lock 102. This increased alignment, in turn, reduces restriction on the cord 108 in the cord lock 102, allowing the cord 108 to slide through the cord lock 102 with less frictional resistance. As shown in FIGS. 2-3, the cord lock 102 is at least partially concealed within the article layer 104. Such concealment may streamline the surface contours of the article 100, and/or at least partially protect and/or obscure components of the cord lock 102.

The cord lock 102 further includes a first cord-clamp bar 114 having a first-bar body 101 and a second cord-clamp bar 116 having a second-bar body 103. The first and second cord-clamp bars 114, 116 are movably coupled to each other, with a portion of each cord-clamp bar 114, 116 extending into and/or through the other cord-clamp bar 114 or 116. As such, when the cord-clamp bars 114, 116 are moved relative to each other, alignment of various through-passages and apertures in the cord lock 102 may occur to reduce restriction on a cord positioned therein. In FIGS. 2-3, the cord lock 102 is positioned between a first side 104A and a second side 104B of the tubular casing 106, being located in an interior space 105. Although shown separate, when assembled, the first and second sides 104A, 104B may be of a unitary or composite construction, and may at least partially retain or house the cord lock 102.

Figure 4:
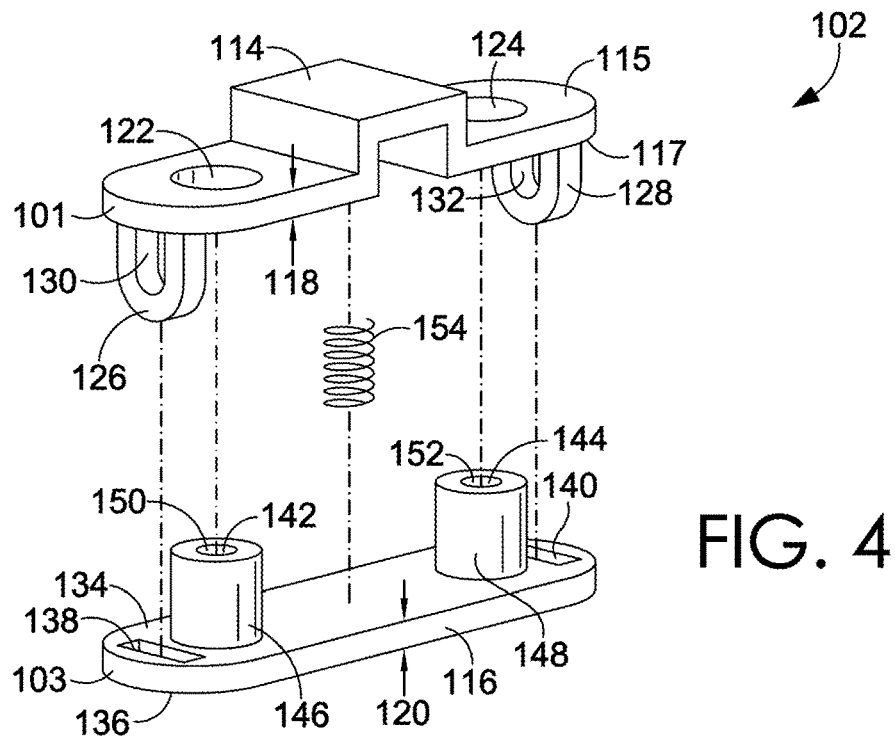
FIG. 4 depicts an exploded view of the cord lock shown in FIGS. 2-3, in accordance with an aspect hereof.
Figure 5:
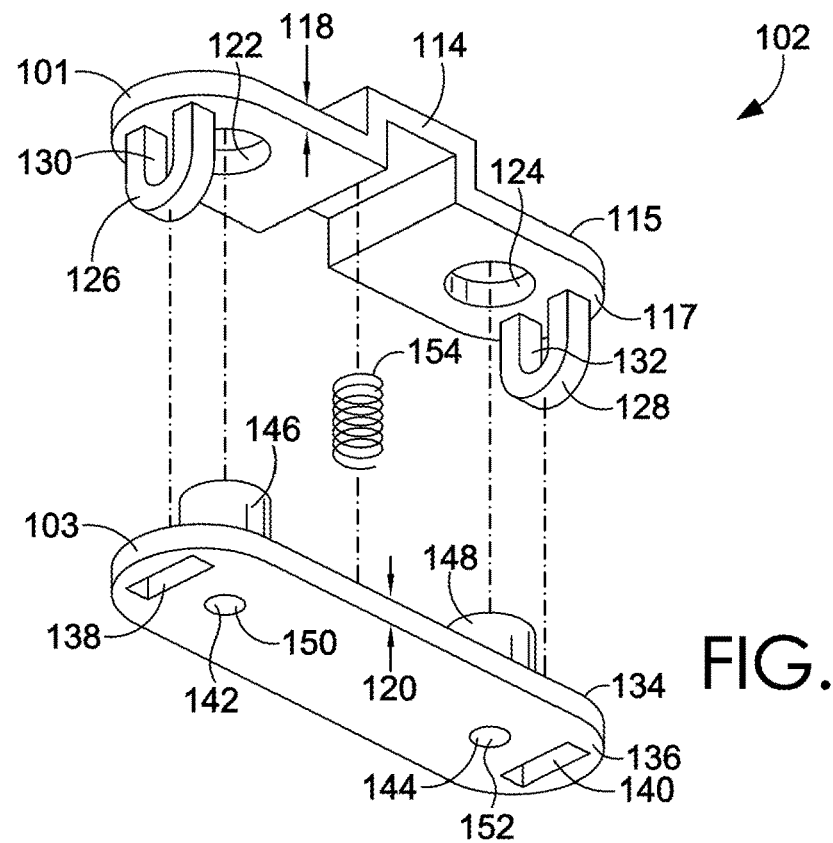
FIG. 5 depicts an alternate perspective view of the cord lock shown in FIG. 4, in accordance with an aspect hereof.

Referring to FIGS. 4-5, exploded perspective views of the cord lock 102 shown in FIGS. 2-3 are provided, in accordance with aspects hereof. The first-bar body 101 of the first cord-clamp bar 114 includes a first side 115 and an opposite second side 117 defining a first thickness 118, and also, a first aperture 122 and a second aperture 124 that extend through the first thickness 118. Extending from the second side 117 of the first cord-clamp bar 114 is a first protruding member 126 and a second protruding member 128. The first and second protruding members 126, 128 extend generally perpendicularly from the first cord-clamp bar 114. The first protruding member 126 includes a first cord-receiving channel 130 (i.e., cord through-channel) and the second protruding member 128 includes a second cord-receiving channel 132 (i.e., cord through-channel). In FIGS. 4-5, the first and second apertures 122, 124 and first and second cord-receiving channels 130, 132 are oriented perpendicularly to each other. In other words, the first and second apertures 122, 124 may be viewed as being oriented along a first hypothetical axis, and the first and second cord-receiving channels 130, 132 may be viewed as being oriented along a second hypothetical axis that is perpendicular to the first hypothetical axis.

The second-bar body 103 of the second cord-clamp bar 116 includes a third side 134 and an opposite fourth side 136 that define a second thickness 120, and also, a third aperture 138 and a fourth aperture 140 that extend through the second thickness 120. The third and fourth apertures 138, 140 are generally shaped to correspond to the cross-sectional shape of the respective first and second protruding members 126, 128 of the first cord-clamp bar 114. The second cord-clamp bar 116 also includes a first protruding tubular member 146 and a second protruding tubular member 148 that extend from the third side 134 of the second cord-clamp bar 116. Furthermore, the second cord-clamp bar 116 includes a fifth aperture 142 and a sixth aperture 144 that extend entirely through the second thickness 120 of the second cord-clamp bar 116, as well as through the respective first and second protruding tubular members 146, 148. The fifth and sixth apertures 142, 144 also provide third and fourth cord-receiving channels 150, 152 in the respective first and second protruding tubular members 146, 148.

The first and second protruding tubular members 146, 148 are sized and positioned on the second cord-clamp bar 116 such that they can be movably received in the respective first and second apertures 122, 124 of the first cord-clamp bar 114. A biasing element 154 is coupled between the first and second cord-clamp bars 114, 116 to provide a force that elastically resists movement of the first and second cord-clamp bars 114, 116 together. As discussed further in later sections, the movement of the first and second protruding members 126, 128 through the respective third and fourth apertures 138, 140 of the second cord-clamp bar 116 and the movement of the first and second protruding tubular members 146, 148 through the respective first and second apertures 122, 124 of the first clamp bar 114 provide alignment or de-alignment of various pathways in the cord lock 102, depending on the direction of movement. This alignment/de-alignment may be used to control an amount of resistance applied to a cord positioned in the cord lock 102 by increasing friction and/or angular direction of the cord in the cord lock 102.

Figure 6:
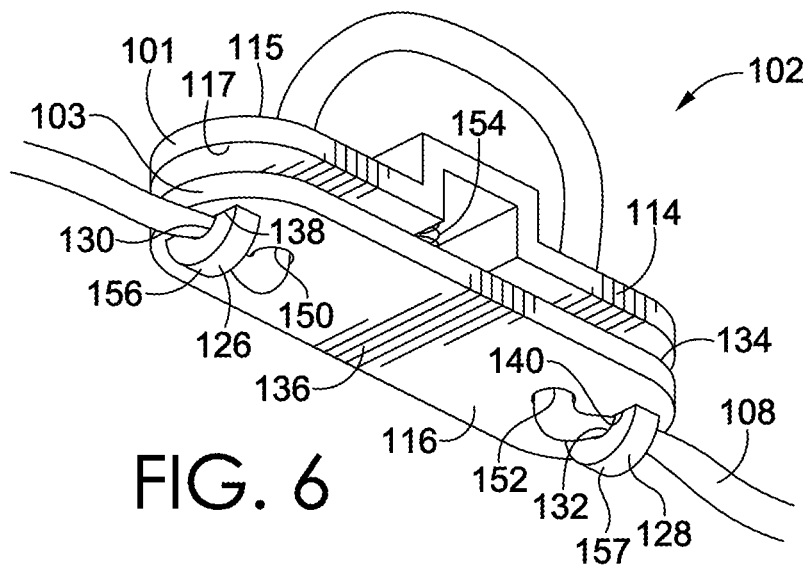
FIG. 6 depicts the cord lock shown in FIGS. 2-5 in a resting state with a cord threadably positioned therein, in accordance with an aspect hereof.
Figure 7:
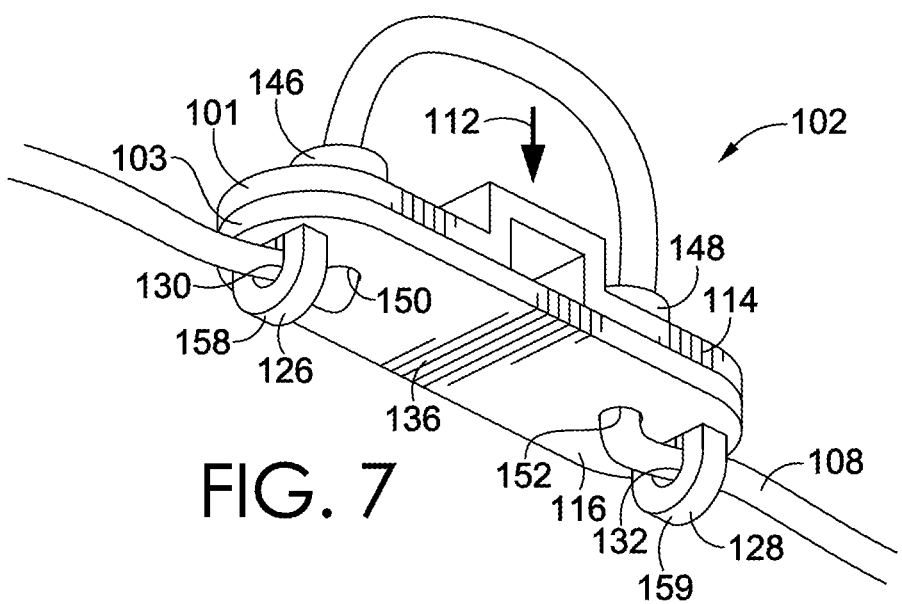
FIG. 7 depicts the cord lock shown in FIG. 6 in an engaged state with a force applied to the cord lock, in accordance with an aspect hereof.

Referring to FIGS. 6-7, the cord lock 102 of FIGS. 2-5 assembled with a cord positioned therein is provided, in accordance with aspects hereof. In FIGS. 6-7, the cord lock 102 includes the cord 108 threaded through the first, second, third, and fourth cord-receiving channels 130, 132, 150, 152. The biasing element 154 is coupled between the first cord-clamp bar 114 and the second cord-clamp bar 116, and provides a biasing force against the second side 117 of the first cord-clamp bar 114 and the third side 134 of the second cord-clamp bar 116. In this respect, when the force 112 is not applied to counteract the biasing force, the first protruding member 126 moves to a first clamping position 156 (shown in FIG. 6) in which a first portion of the first cord-receiving channel 130 is circumscribed by a perimeter of the third aperture 138, and the second protruding member 128 moves to a second clamping position 157 (shown in FIG. 6) in which a second portion of the second cord-receiving channel 132 is circumscribed by a perimeter of the fourth aperture 140. In the first and second clamping positions 156, 157, the cord 108 is actively squeezed or forced against an edge of the respective third and fourth apertures 138, 140 of the second cord-clamp bar 116, increasing friction on the cord 108.

When the force 112 is applied to the cord lock 102 to resist the force of the biasing element 154, as shown in FIG. 7, the first protruding member 126 moves to a first release position 158 (shown in FIG. 7) in which a third portion of the first cord-receiving channel 130 is circumscribed by the perimeter of the third aperture 138, and the second protruding member 128 moves to a second release position 159 (shown in FIG. 7) in which a fourth portion of the second cord-receiving channel 132 is circumscribed by the fourth aperture 140. In the first and second release positions 158, 159, a cross-sectional area of the first and second cord-receiving channels 130, 132 that is exposed from the fourth side 136 of the second clamp bar 116 is greater than in the first and second clamping positions 156, 157. As such, in the first and second release positions 158, 159, the amount of friction applied to the cord 108 is less than in the first and second clamping positions 156, 157, due to the larger portion of the first and second cord-receiving channels 130, 132 that is exposed, allowing the cord 108 to slide through the cord lock 102 with less frictional resistance.

Figure 8:
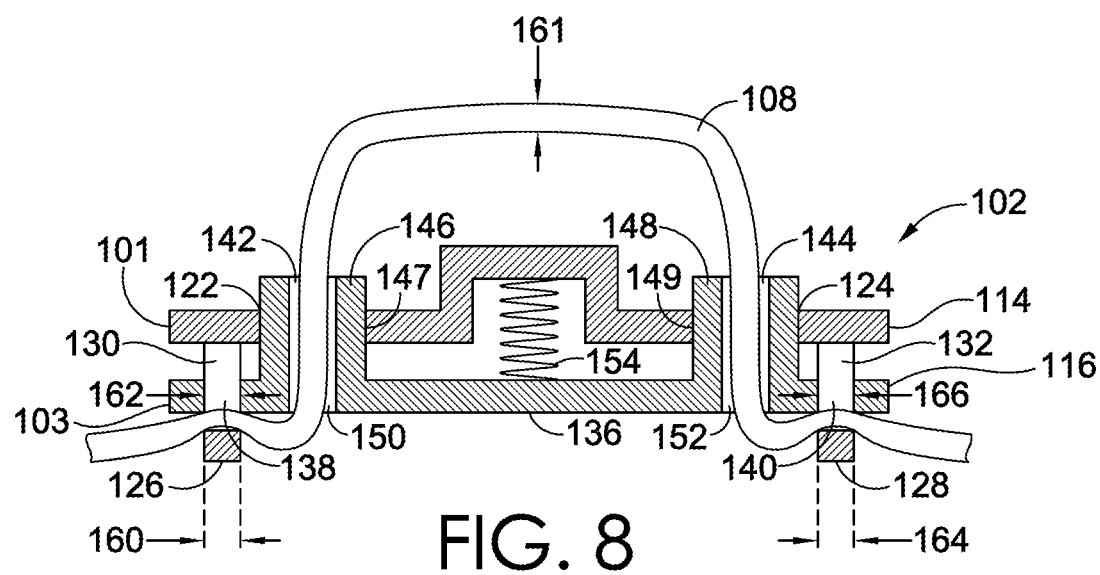
FIG. 8 depicts a cross-section elevation view of the cord lock shown in FIGS. 2-7, in accordance with an aspect hereof.
Figure 9:
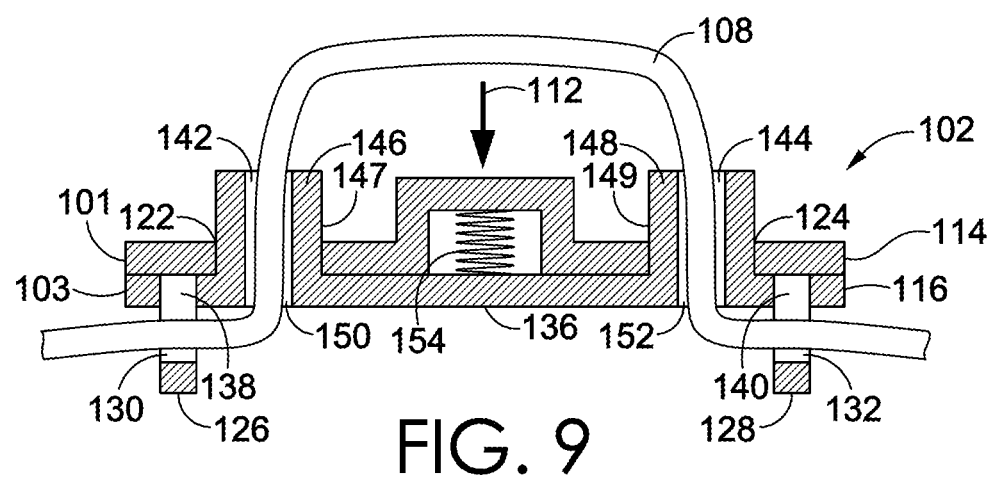
FIG. 9 depicts the cord lock shown in FIG. 8 with a force applied to the cord lock, in accordance with an aspect hereof.

Referring to FIGS. 8-9, cross-section elevation views of the cord lock 102 shown in FIGS. 2-7 are provided, in accordance with aspects hereof. In FIGS. 8-9, the components of the cord lock 102 are again depicted. Additionally, the first protruding member 126 includes a first-protruding-member thickness 160 and the third aperture 138 includes a third-aperture width 162, the third-aperture width 162 being larger than the first-protruding-member thickness 160, such as by an amount that is less than double a thickness 161 of the cord 108. The second protruding member 128 includes a second-protruding-member thickness 164 and the fourth aperture 140 includes a fourth-aperture width 166. The fourth-aperture width 166 may be larger than the second-protruding-member thickness 164, such as by an amount that is less than double the thickness 161 of the cord 108.

As further shown in FIGS. 8-9, the first protruding tubular member 146 includes a first tubular wall 147 that at least partially circumscribes the fifth aperture 142 and the third cord-receiving channel 150, and the second protruding tubular member 148 further includes a second tubular wall 149 that at least partially circumscribes the sixth aperture 144 and the fourth cord-receiving channel 152. As shown in FIG. 9, the application of the force 112 to the cord lock 102 adjusts the part of the tubular walls 147, 149 positioned in the respective first and second apertures 122, 124 of the first cord-clamp bar 114, and provides greater linearity of the path of the cord 108 between the first and third cord-receiving channels 130, 150 and between the second and fourth cord-receiving channels 132, 152 which, in turn, reduces friction and resistance on the cord 108.

Figure 10:
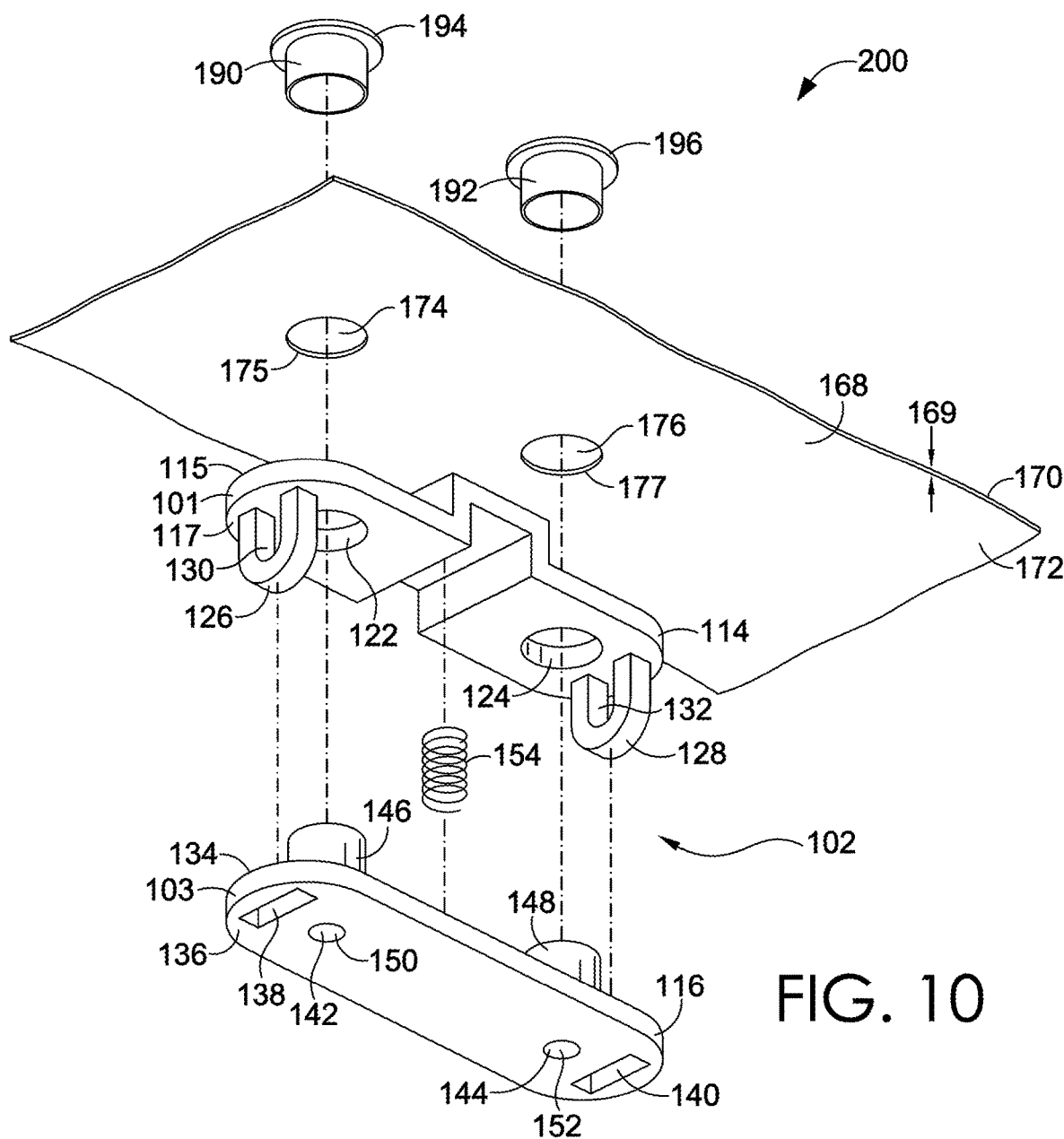
FIG. 10 depicts an exploded perspective view of the cord lock shown in FIGS. 3-4 along with a textile layer, in accordance with an aspect hereof.

Referring to FIG. 10, a partial, exploded, perspective view of an article 200 incorporating the cord lock 102 is provided, in accordance with an aspect hereof. FIG. 10 once again depicts the cord lock 102 and the components thereof, in addition to a first textile layer 168 having first and second textile apertures 174, 176 circumscribed by first and second aperture collars 175, 177 that form a perimeter around the first and second textile apertures 174, 176. The article 200 further includes first and second grommets 190, 192 that may be coupled to the cord lock 102 and to the first textile layer 168. The first textile layer 168 includes a first surface 170 and a second surface 172, with the first and second textile apertures 174, 176 extending through a thickness 169 of the first textile layer 168 between the first surface 170 and the second surface 172. Accordingly, when the article 200 is assembled, at least a portion of the first protruding tubular member 146 may extend into and/or through the first textile aperture 174, and at least a portion of the second protruding tubular member 148 may extend into and/or through the second textile aperture 176.

The first and second grommets 190, 192 shown in FIG. 10 may be configured to be joined to the first textile layer 168 and/or to the cord lock 102. The first grommet 190 includes a first-grommet flange 194 that may be coupled to the first surface 170 of the first textile layer 168 or to the first or second side 115, 117 of the first cord-clamp bar 114, and the second grommet 192 includes a second-grommet flange 196 that may be coupled to the first surface 170 of the first textile layer 168 or to the first or second side 115, 117 of the first cord-clamp bar 114, to secure the cord lock 102 to the first textile layer 168. The coupling between the first and second grommets 190, 192 and the first textile layer 168 or the cord lock 102 may utilize adhesive, frictional coupling, welding (e.g., ultrasonic welding), hook-and-loop fasteners, and/or another attachment method.

Furthermore, in another sense, the first and second grommets 190, 192 may be coupled to, and/or inserted through, the first cord-clamp bar 114 from the first surface 170 and through the first textile layer 168, such that the first and second grommet flanges 194, 196 are positioned against or abut the first surface 170 of the first textile layer 168. Alternatively, the first and second grommets 190, 192 may be coupled to, and/or inserted through, the first cord-clamp bar 114 from the second side 117 of the first cord-clamp bar 114, such that the first and second grommet flanges 194, 196 are positioned against or abut the second side 117 of the first cord-clamp bar 114. In this sense, the first and second grommets 190, 192 may be inserted through either side 115, 117 of the first cord-clamp bar 114 and/or either side of the first textile layer 168, in exemplary aspects.

Figure 11:
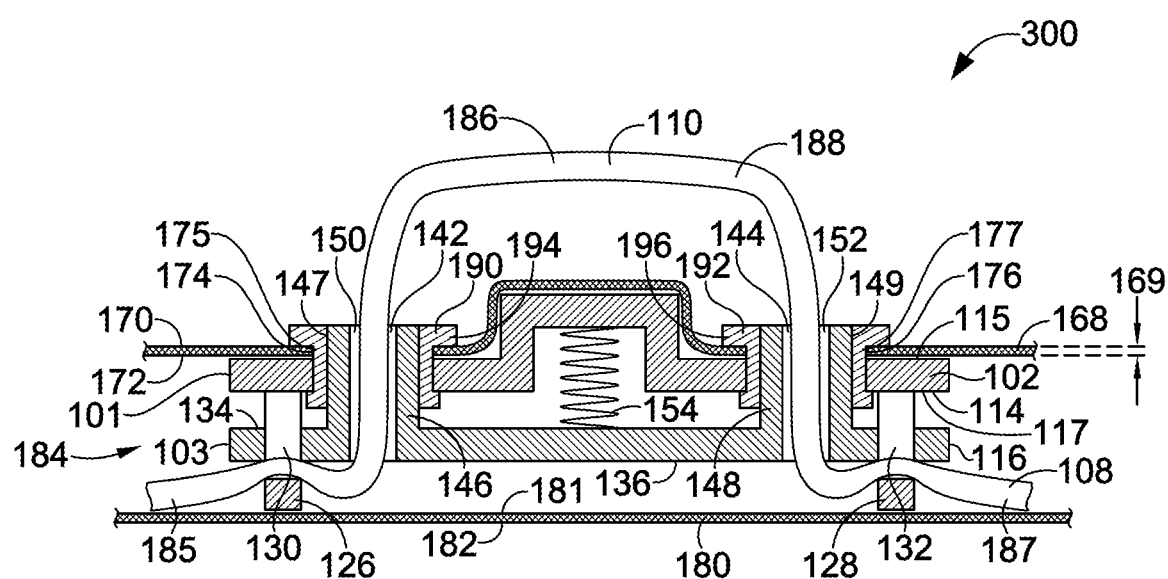
FIG. 11 depicts an elevation cross-section view of the cord lock shown in FIG. 10 positioned within a tubular sleeve formed by the textile layer, in accordance with an aspect hereof.

Referring to FIG. 11, a partial, elevation, cross-section view of an article 300 incorporating the cord lock 102 is provided, in accordance with an aspect hereof. In FIG. 11, the cord lock 102 and the components thereof are once again shown. The first side 115 of the first cord-clamp bar 114 is adjacent and coupled to the second surface 172 of the first textile layer 168. The first and second protruding tubular members 146, 148 extend at least partially through the first and second textile apertures 174, 176, thereby also extending the third and fourth cord-receiving channels 150, 152 through the first and second textile apertures 174, 176. As a result, a path for the cord 108 to pass through the first textile layer 168 is provided. The first and second grommets 190, 192 are coupled to the respective first and second aperture collars 175, 177 and to the cord lock 102, with the first and second grommet flanges 194, 196 coupled to the first surface 170 of the first textile layer 168. In alternate aspects, the first and second grommet flanges 194, 196 may be coupled to the second side 117 of the first cord-clamp bar 114, or to another part of the cord lock 102.

As shown in FIG. 11, the cord 108 passes sequentially through the first cord-receiving channel 130, the third cord-receiving channel 150, the fourth cord-receiving channel 152, and the second cord-receiving channel 132. In the aspect shown in FIG. 11, the first cord-clamp bar 114 and the second cord-clamp bar 116 are oriented such that they are movable relative to each other along a hypothetical axis of the first and second textile apertures 174, 176. In other words, a force applied against the cord lock 102 along the hypothetical axis of the first and second textile apertures 174, 176 may move the first and second cord-clamp bars 114, 116 relative to each other, increasing or decreasing resistance on the cord 108 positioned in the cord lock 102.

Further provided in FIG. 11 is a second textile layer 180. In aspects, the second textile layer 180 may be secured to the cord lock 102 (e.g., to the first and second protruding members 126, 128), or may be unsecured from the cord lock 102 (i.e., free-floating relative to the cord lock 102). The second textile layer 180 includes a third surface 181 and a fourth surface 182. The third surface 181 faces towards, and is spaced apart from, the second surface 172 of the first textile layer 168. Additionally, the first and second cord-clamp bars 114, 116 are positioned between the second surface 172 of the first textile layer 168 and the third surface 181 of the second textile layer 180. The first textile layer 168 and the second textile layer 180 may be coupled to form a tubular sleeve 184 (e.g., through a unitary or composite construction), which may be similar to or the same as the tubular casing 106 shown in FIG. 1. In FIG. 11, the cord 108 includes a first cord portion 185 that is enclosed by the tubular sleeve 184, a second cord portion 186 that is not enclosed by the tubular sleeve 184, and a third cord portion 187 that is enclosed by the tubular sleeve 184. The second cord portion 186 extends directly from the third cord-receiving channel 150 to the fourth cord-receiving channel 152.

In an exemplary implementation and use, the cord lock 102 may be incorporated into a cuff, sleeve, layer, or other portion of an article. The cord lock 102 may be engaged by a user squeezing the cuff, sleeve, layer, or other portion of the article to move the first and second cord-clamp bars 114, 116 together, providing greater alignment of apertures and through-channels in the cord lock 102. As a result, restriction on the cord 108 positioned in the cord lock 102 is reduced, and a user may pull on the looped portion 110 of the cord 108 to adjust its length as desired with less resistance than when the cord lock 102 is in a resting state with no force applied. Upon removing the force to the cuff, sleeve, layer, or other portion of the article, the first and second cord-clamp bars 114, 116 will once again move apart, increasing frictional resistance on the cord 108.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made of the invention without departing from the scope thereof, it is to be understood that all matter herein set forth or shown in the accompanying drawings is to be interpreted as illustrative and non-limiting.

What is claimed is:

1. A method of manufacturing a cord lock, the method comprising:
    forming a first cord-clamp bar having a first-bar body with a first side and a second side, the second side opposite to the first side, the first-bar body including a first thickness between the first side and the second side,
    wherein the first-bar body includes a first aperture and a second aperture that extend entirely through the first thickness of the first-bar body from the first side to the second side,
    wherein the first cord-clamp bar includes a first protruding member that extends from the second side of the first-bar body, the first protruding member including a first cord-receiving channel, and
    wherein the first cord-clamp bar includes a second protruding member that extends from the second side of the first-bar body, the second protruding member including a second cord-receiving channel;
    forming a second cord-clamp bar having a second-bar body with a third side and a fourth side, the third side opposite to the fourth side, the second-bar body including a second thickness between the third side and the fourth side,
    wherein the second-bar body includes a third aperture and a fourth aperture that extend entirely through the second thickness of the second-bar body from the third side to the fourth side, the first protruding member of the first cord-clamp bar extending through the third aperture, the second protruding member of the first cord-clamp bar extending through the fourth aperture, and
    wherein the second cord-clamp bar includes a fifth aperture and a sixth aperture extending entirely though the second thickness of the second-bar body, the fifth aperture being axially aligned with the first aperture and including a third cord-receiving channel, and the sixth aperture being axially aligned with the second aperture and including a fourth cord-receiving channel; and
    coupling a biasing element between the first cord-clamp bar and the second cord-clamp bar.

2. The method of manufacturing the cord lock of claim 1, further comprising extending a cord through the first, second, third, and fourth cord-receiving channels.

3. The method of manufacturing the cord lock of claim 1, wherein the biasing element comprises a spring.

4. The method of manufacturing the cord lock of claim 1, further comprising incorporating the cord lock at least partially with an article layer.

5. The method of manufacturing the cord lock of claim 4, wherein the article layer forms at least a portion of an article.

6. The method of manufacturing the cord lock of claim 5, further comprising extending a cord through the cord lock and through the article layer.

7. The method of manufacturing the cord lock of claim 1, further comprising extending a cord through the cord lock, wherein the cord comprises a monofilament.

8. The method of manufacturing the cord lock of claim 1, further comprising extending a cord through the cord lock, wherein the cord comprises multiple filaments.

9. A cord lock, comprising:
    a first cord-clamp bar,
    wherein the first cord-clamp bar comprises a first aperture and a second aperture spaced from the first aperture, and
    wherein the first cord-clamp bar includes a first protruding member having a first cord-receiving channel and a second protruding member having a second cord-receiving channel, the second protruding member spaced from the first protruding member;
    a second cord-clamp bar,
    wherein the second cord-clamp bar includes a third aperture and a fourth aperture spaced from the third aperture,
    wherein the first protruding member is alignable with the third aperture and is extendable therethrough, and
    wherein the second protruding member is alignable with the fourth aperture and is extendable therethrough; and
    a biasing element that biases the first cord-clamp bar and the second cord-clamp bar away from each other.

10. The cord lock of claim 9, further comprising a cord extending through the first cord-receiving channel and the second cord-receiving channel.

11. The cord lock of claim 9, wherein the biasing element comprises a spring.

12. The cord lock of claim 9, wherein the cord lock is at least partially incorporated with an article layer.

13. The cord lock of claim 12, wherein the article layer forms at least a portion of an article.

14. The cord lock of claim 9, further comprising a cord extending through the cord lock, wherein the biasing element biases the first cord-clamp bar away from the second cord-clamp bar to impart frictional resistance to the cord extending through the cord lock.

15. A method of manufacturing a cord lock, the method comprising:
   forming a first cord-clamp bar,
      wherein the first cord-clamp bar comprises a first aperture and a second aperture spaced from the first aperture, and
      wherein the first cord-clamp bar includes a first protruding member having a first cord-receiving channel and a second protruding member having a second cord-receiving channel, the second protruding member spaced from the first protruding member;
   forming a second cord-clamp bar,
      wherein the second cord-clamp bar includes a third aperture and a fourth aperture spaced from the third aperture,
      wherein the first protruding member is alignable with the third aperture and is extendable therethrough, and
      wherein the second protruding member is alignable with the fourth aperture and is extendable therethrough; and
   coupling a biasing element between the first cord-clamp bar and the second cord-clamp bar, such that the biasing element biases the first cord-clamp bar and the second cord-clamp bar away from each other.

16. The method of manufacturing the cord lock of claim 15, further comprising extending a cord through the first cord-receiving channel and the second cord-receiving channel.

17. The method of manufacturing the cord lock of claim 15, further comprising at least partially incorporating the cord lock with an article layer.

18. The method of manufacturing the cord lock of claim 17, wherein the article layer forms at least a portion of an article.

\* \* \* \* \*